US006970459B1

(12) United States Patent  
Meier

(10) Patent No.: US 6,970,459 B1  
(45) Date of Patent: Nov. 29, 2005

(54) MOBILE VIRTUAL NETWORK SYSTEM AND METHOD

(75) Inventor: Robert C. Meier, Cuyahoga Falls, OH (US)

(73) Assignee: Intermec IP Corp., Everett, WA (US)

( * ) Notice: Subject to any disclaimer, the term of this patent is extended or adjusted under 35 U.S.C. 154(b) by 788 days.

(21) Appl. No.: 09/729,676

(22) Filed: Dec. 2, 2000

Related U.S. Application Data

(63) Continuation-in-part of application No. 09/569,548, filed on May 12, 2000.

(60) Provisional application No. 60/168,607, filed on Dec. 2, 1999, provisional application No. 60/133,996, filed on May 13, 1999.

(51) Int. Cl.[7] .............................................. H04L 12/28
(52) U.S. Cl. ....................... 370/389; 370/401; 709/217
(58) Field of Search ............................... 370/329, 389, 370/352, 320, 331, 392, 401, 420, 460, 473, 370/466; 709/239, 217; 704/228

(56) References Cited

U.S. PATENT DOCUMENTS

| | | | |
|---|---|---|---|
| 5,159,592 | A | 10/1992 | Perkins |
| 5,410,543 | A | 4/1995 | Seitz et al. |
| 5,533,029 | A | 7/1996 | Gardner |
| 5,544,222 | A | 8/1996 | Robinson et al. |
| 5,564,070 | A | 10/1996 | Want et al. |
| 5,572,528 | A | 11/1996 | Shuen |
| 5,659,580 | A | 8/1997 | Partyka |
| 5,708,655 | A | 1/1998 | Toth et al. |
| 5,745,884 | A | 4/1998 | Carnegie et al. |
| 5,881,235 | A | 3/1999 | Mills |

(Continued)

FOREIGN PATENT DOCUMENTS

CA 2213984 A1 2/1998

OTHER PUBLICATIONS

Perkins, C Editor, "IP Mobility Support", RFC 2002, Oct. 1996, p. 1 of 74 to p. 22 of 74.

(Continued)

*Primary Examiner*—Chi Pham  
*Assistant Examiner*—Alexander O. Boakye

(57) ABSTRACT

A communication system in which multiple protocols and proxy services are executed by an access point. In one embodiment of the invention, GVRP and GMRP registrations are combined in a single packet when a wireless device roams to a different VLAN. In addition, outbound GVRP and GMRP multicast messages are handled by an access point (also referred to as a GVRP and GMRP "gateway") such that the wireless device is not burdened with the associated computational overhead. In a further embodiment, a wireless device may dynamically switch between a VLAN-aware state and a VLAN-unaware state depending on the nature of a detected access point. For example, if a relevant access point supports GVRP, the wireless device may operate as a VLAN terminal. If a wireless device is not attached to an access point with a matching VLAN ID, the wireless device sends and receives VLAN tagged frames. If a wireless device configured with a VLAN ID is attached to an access point with a matching VLAN ID, or if the wireless device is attached to a non-VLAN access point, then the wireless device may send and receive raw/untagged frames. In addition to the gateways described below, the ability of a wireless device to detect when it can send untagged frames is considered novel. In another embodiment of the invention, a special ID that is different than the native VLAN ID for a switch port is used for VLAN-unaware devices. This allows such devices that do not issue tagged frames to belong to a single VLAN ID.

22 Claims, 6 Drawing Sheets

LAC-VPN

U.S. PATENT DOCUMENTS

| | | |
|---|---|---|
| 5,943,692 A | 8/1999 | Marberg |
| 5,946,615 A | 8/1999 | Holmes et al. |
| 5,960,344 A * | 9/1999 | Mahany |
| 6,307,837 B1 * | 10/2001 | Ichikawa et al. |
| 6,651,105 B1 * | 11/2003 | Bhagwat et al. ............ 709/239 |
| 6,701,361 B1 | 3/2004 | Meier |
| 6,738,362 B1 * | 5/2004 | Xu et al. .................... 370/329 |

OTHER PUBLICATIONS

Sklower, K, et al., "The PPP Multilink Protocol (MP)", RFC 1990, Aug. 1996, p. 1 of 19 to p. 19 of 19.

Townsley, W et al., "Layer Two Tunneling Protocol 'L2TP'", RFC 2661, Aug. 1999, p. 1 of 60 to p. 20 of 60.

* cited by examiner

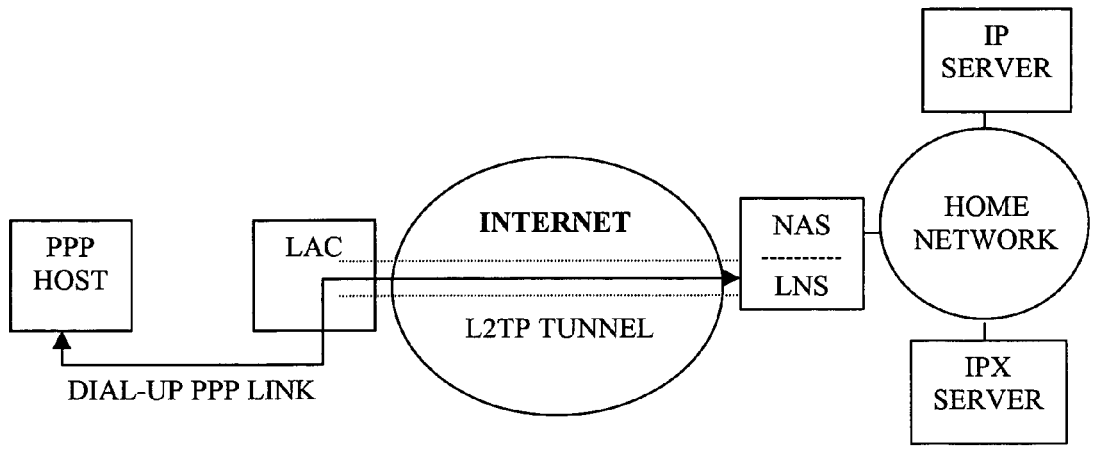
FIGURE 1. LAC-VPN
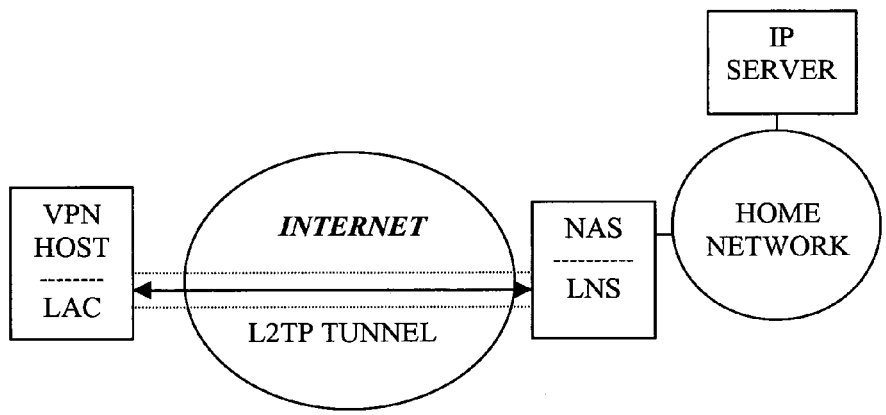
FIGURE 2. CLIENT-VPN
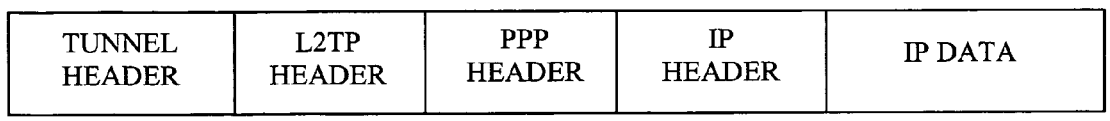
FIGURE 3. VPN TUNNEL PACKET

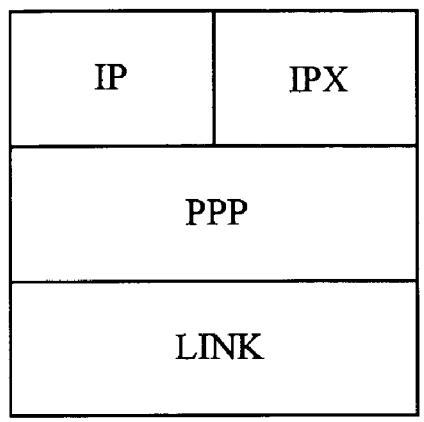
FIGURE 4. PPP HOST PROTOCOL STACK
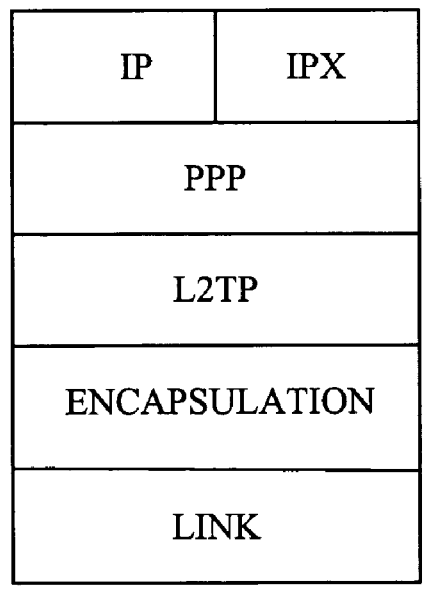
FIGURE 5. VPN HOST PROTOCOL STACK

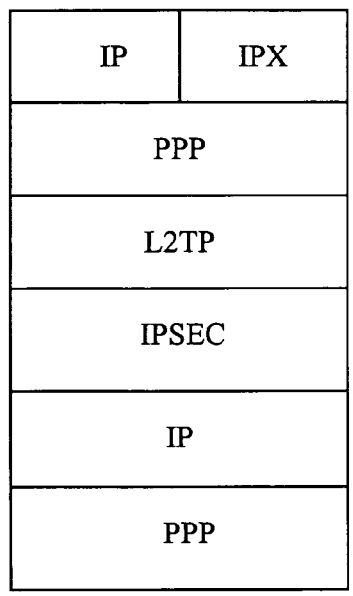
FIGURE 6. VPN HOST PROTOCOL STACK WITH IP ENCAPSULATION
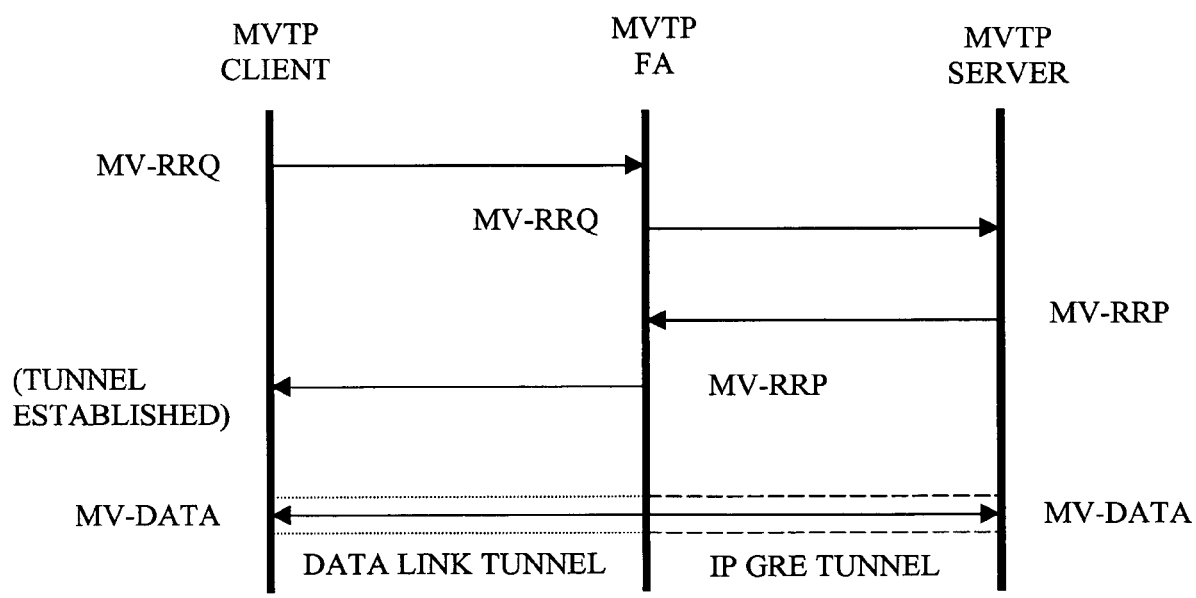
FIGURE 7. MVTP TUNNEL ESTABLISHMENT

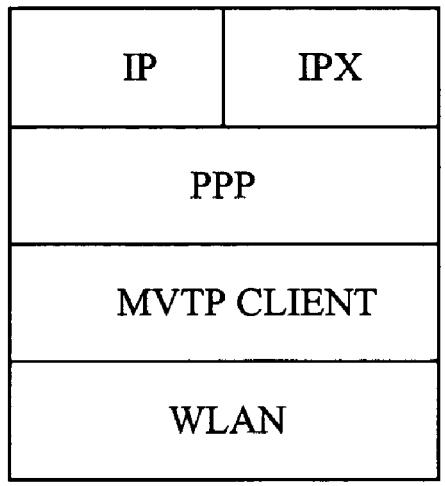
FIGURE 8. WLAN PPP HOST PROTOCOL STACK.
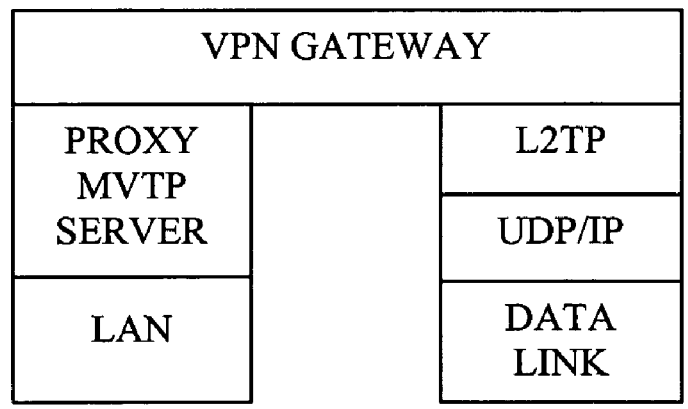
FIGURE 9. MVTP FA PROTOCOL STACK.

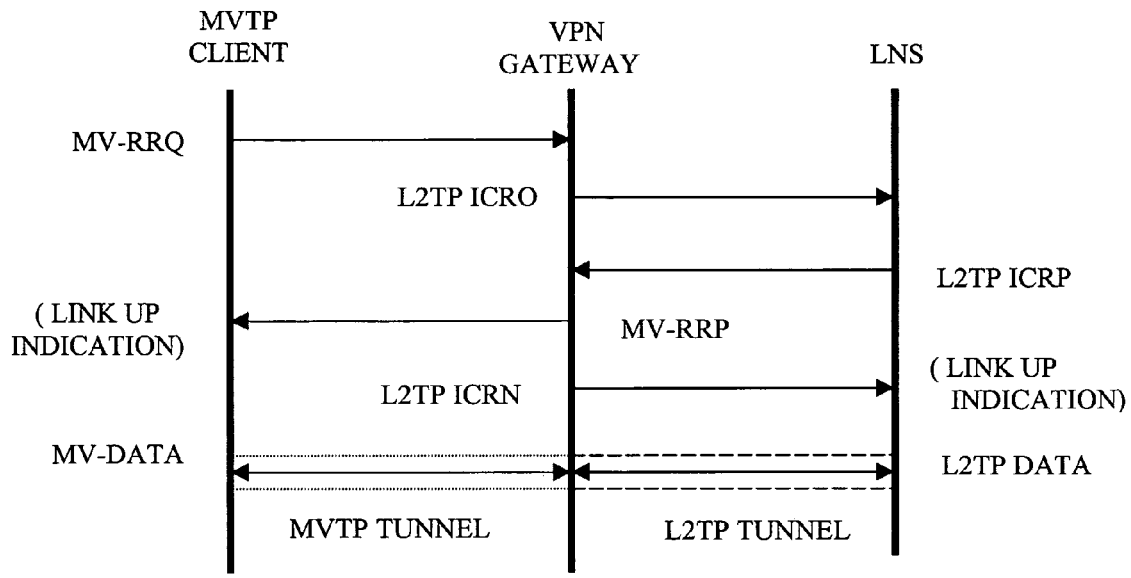
FIGURE 10. MOBILE PPP TUNNEL ESTABLISHMENT
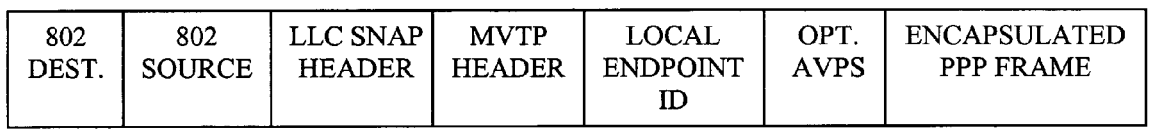
FIGURE 11. MOBILE PPP DATA FRAME
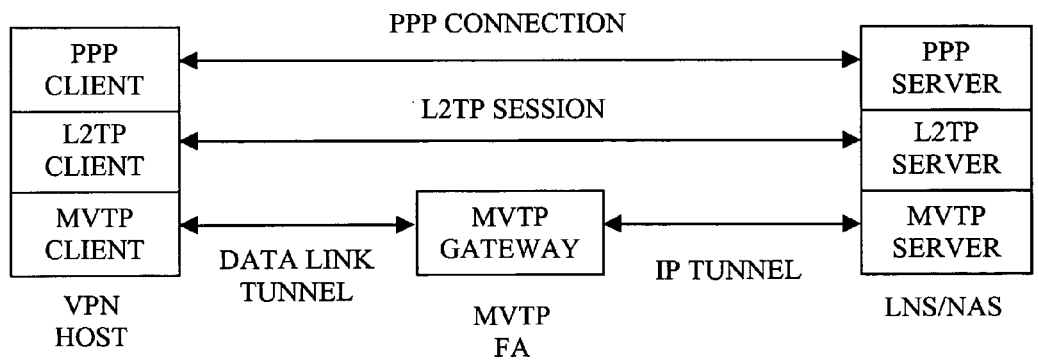
FIGURE 12. MOBILE L2TP PROTOCOL STACKS

| IP HEADER - LNS SOURCE AND FA DESTINATION | GRE HEADER | MVTP HEADER | LOCAL ENDPOINT ID | OPT. AVPS | ENCAPSULATED L2TP MESSAGE |

FIGURE 13. MOBILE L2TP IP/GRE PACKET

| CLIENT 802 DEST. | FA 802 SOURCE | LLC SNAP HEADER | MVTP HEADER | LOCAL ENDPOINT ID | OPT. AVPS | ENCAPSULATED L2TP MESSAGE |

FIGURE 14. MOBILE L2TP DATA-LINK FRAME

| CLIENT 802 DEST. | FA 802 SOURCE | LLC SNAP HEADER | IP HEADER | IPSEC ESP HEADER | GRE HEADER | MVTP HEADER | LOCAL ENDPOINT ID | L2TP MESSAGE |

FIGURE 15. MOBILE L2TP FRAME WITH IPSEC ENCAPSULATION

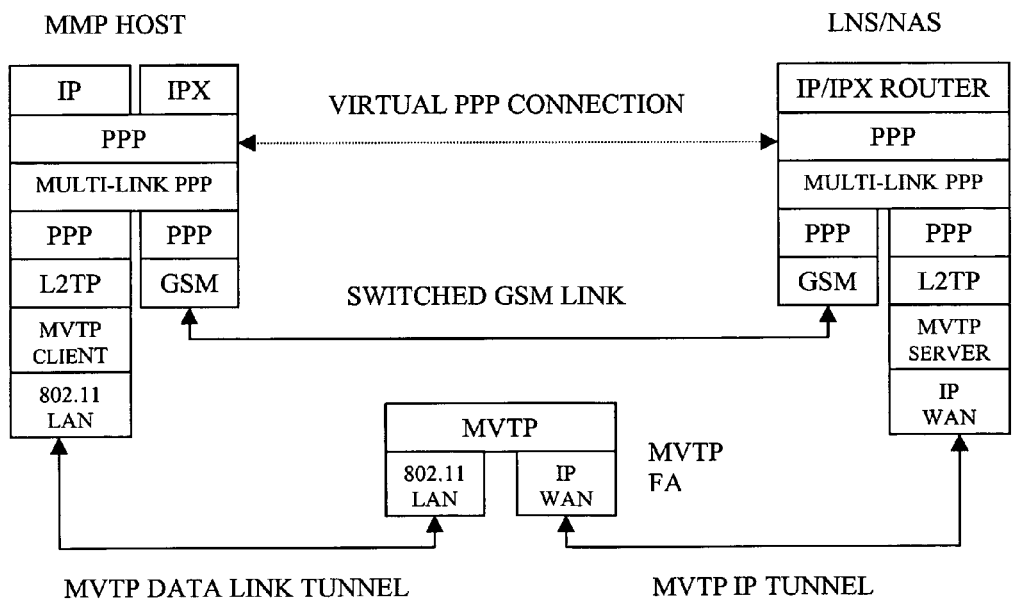

FIGURE 16. MMP PROTOCOL RELATIONSHIPS

MOBILE VIRTUAL NETWORK SYSTEM AND METHOD

CROSS REFERENCES TO RELATED APPLICATIONS

The present application claims the benefit of provisional application No. 60/168,607 filed Dec. 2, 1999, and is a continuation-in-part of application Ser. No. 09/569,548 filed May 12, 2000, which in turn claims the benefit of provisional application No. 60/133,996 filed May 13, 1999. The aforesaid provisional applications and said application Ser. No. 09/569,548 filed May 12, 2000 are hereby incorporated herein by reference in their entirety including appendices.

Several standards currently exist that enable remote end systems or networks to access a home network, from a remote location, over an underlying "internetwork" such as a switched carrier network or the Internet.

The point-to-point protocol (PPP) is primarily used on communication sessions on switched point-to-point connections between a "dial-up" remote end system and a network access server. PPP is actually a suite of protocols that are used for authentication, encryption, link and network parameter negotiation, etc.

A Virtual Private Network (VPN) is used to connect a physically remote network or host to a "home network", over another "internetwork", through a logical PPP link. A VPN allows the end point of a PPP connection to be decoupled from the end point of an underlying physical point-to-point connection. A brief overview of VPN technology is provided below. FIGS. 1 and 2 illustrate two basic modes of VPN operation. In FIG. 1, a Local Access Concentrator (LAC) provides the remote end point of a VPN tunnel for a PPP host. In FIG. 2, the remote end of the VPN tunnel exists in a "VPN client". The terms "PPP host" and "VPN host" refer to the host types illustrated by FIGS. 1 and 2, respectively.

The mobile VPN approaches discussed in this document are intended to support two distinct modes of operation that parallel the example VPNs shown in FIG. 1 and FIG. 2. The selected approaches are intended to minimize changes, to existing VPN software, in hosts and routers.

1) In the first case, an "MVTP foreign agent" (MVTP FA) replaces the LAC, in FIG. 1, and provides the remote VPN tunnel end point for mobile PPP hosts. "Mobile PPP" is an MVTP-based mobility solution for PPP hosts.
2) In the second case, a VPN host directly establishes a VPN over an MVTP transport. "Mobile L2TP" is an MVTP-based mobility solution for VPN hosts.

A couple possible operational modes, that are fairly obvious, are not considered:

3) MVTP could be used as the end-to-end transport for a PPP connection between a mobile PPP host and an NAS. In that case, PPP would run directly on top of MVTP, rather that on top of L2TP, in both the host and the NAS.
4) MVTP could include a mode of operation that does not require a foreign agent, much like Mobile IP defines a mode of operation that does not require a foreign agent.

MVTP can also be used as a handoff protocol for IP subnet roaming:

5) An MVTP HA can notify an "old" MVTP FA when a mobile host roams from an "old" IP subnet to a "new" IP subnet and registers through a "new" MVTP FA. The "old" MVTP FA can notify the distribution system associated with the "old" subnet.

"Mobile VPN Protocol" (Mobile VPNP) is a general term that refers to any PPP or VPN mobility solution that incorporates MVTP.

Mobile IP is used to connect an IP host, on a remote IP network, to its home IP network, through an "IP tunnel". A brief overview of Mobile IP is provided in appendix A. MVTP is loosely based on the Mobile IP protocol, as defined in RFC 2002; however, it is extended to support any higher layer protocol.

It is possible for a single MVTP FA to provide access for a) mobile PPP hosts, b) mobile VPN hosts, and c) mobile hosts that use RFC 2002 Mobile IP.

This document also discusses how a mobile host, with dual LAN/WAN radio access, can roam seamlessly between wireless LAN links and wireless WAN (i.e. GSM) links. "Mobile Multi-link PPP" (MMP) is an MVTP-bases mobility solution for VPN hosts with dual LAN/WAN radios.

It is assumed that an IP network, such as the Internet, provides the internetwork for a VPN; however, the general concepts apply to other internetwork types, such as ATM.

L2TP is used to illustrate VPN tunneling logic; however, the concepts apply to VPN tunnels that are implemented with PPTP or L2F.

The approaches discussed in this document are based on the following assumptions:

1) Minimal changes should be required for existing protocols and software.
2) Mobile VPNP must support both enterprise and global roaming.
3) Mobile VPNP must support rapid roaming.
4) DHCP and/or BOOTP do not provide a suitable mechanism for obtaining an IP "care-of" address. Multiple connections must be multiplexed over a single foreign agent care-of address.
5) Mobile VPNP must be transparent to protocols above the data link layer.

TERMINOLOGY

As much as possible, the terms and acronyms used in this document are consistent with the terms and acronyms that are defined in the L2TP RFC [7]and in the Mobile IP RFC [1].

VPN—virtual private network. In this document, L2TP provides the tunneling protocol for a VPN.

Home network—the home network of a mobile host. The IP address of a mobile IP host, for example, is in the domain of the home network. The home network includes the home subnet of the mobile host.

Internetwork—In this document, an internetwork is the underlying network that provides an IP tunnel between a mobile host and its home subnet. An internetwork can be the mobile host's home enterprise network, or a foreign network. A foreign network may consist of the Internet and an Internet service provider network, for example.

Mobile host—A mobile host can be an end system or router. In this document, it is assumed that a mobile host is an end system attached on a wireless link(s). Note that a mobile host can support protocols other that IP (i.e. IPX).

MVTP FA—MVTP Foreign Agent.

PPP host—a mobile host that uses PPP, on its network link, but does not contain VPN logic.

VPN host—a mobile host that contains a remote VPN tunnel end point (i.e. a LAC). A L2TP client is the VPN software entity in a VPN host.

L2TP—Layer Two Tunneling Protocol. L2TP is an Internet standard VPN tunneling protocol.

PPTP—Point-to-point Tunneling Protocol. PPTP is a Microsoft-proprietary VPN tunneling protocol.

LAC—L2TP access concentrator. A LAC is at the remote end of a VPN tunnel.

LNS—L2TP network server. An LNS is at the home network end of a VPN tunnel. Note that an LNS is equivalent to a Microsoft PPTP server.

NAS—a network access server. In this document, an NAS provides access to a "home network".

ISP—an internet service provider. In this document, an ISP provides local access to an internetwork that is used to connect a mobile host to its "home network" through a VPN.

WLAN—wireless LAN. In this document, a wireless LAN can be considered as an IEEE 802.11 LAN.

Mobile IP—The Mobile IP standard protocol defined in RFC 2002.

VPN Overview.

This section provides a brief introduction to PPP and Virtual Private Networks. More detailed information is readily available.

PPP is actually a suite of protocols that are used to set up and configure point-to-point communications sessions. It includes a link control protocol (LCP), an encryption control protocol (ECP), a compression control protocol (CCP), various network control protocols, including IPCP and IPXCP, etc. Multi-link PPP or MP allows a single PPP connection to be multiplexed over multiple links, where links can be dynamically added and deleted. A Bridging Control Protocol (BCP) can be used to negotiate "bridging" over PPP links for non-routable protocols (i.e. DEC LAT).

Accessing a network through PPP provides several advantages.

a) Standardized authentication with PAP or CHAP.
b) NAS PPP implementations interface with RADIUS or TACACS security servers.
c) Standardized compression negotiation.
d) Standardized encryption negotiation.
e) Support for any network layer protocol.
f) A standard mechanism for allocating network layer addresses.
g) A mechanism for dynamically binding network layer addresses to a point-to-point network interface.

A Virtual Private Network (VPN) can be used to connect a network host to its home network over another network, such as the Internet. A VPN is most commonly implemented by logically extending a PPP connection through an L2TP or PPTP tunnel. In practice, each end point of a VPN tunnel is often defined by an IP address. FIG. 1 shows the logical components for a typical VPN with an underlying IP internetwork. The dial-up link and the L2TP tunnel are concatenated to form a logical PPP link between the remote host and the network access server (NAS) for the home network. A local IP address is associated with the end point of the L2TP tunnel in the L2TP access concentrator (LAC). An IP address on the home network is associated with the end point of the L2TP tunnel in the L2TP network server (LNS). Logically, the remote host is on a point-to-point subnet of the home network. An L2TP tunnel such as the one in FIG. 1 is often called a "compulsory tunnel".

FIG. 2 shows an example VPN where the LAC is contained in the point-to-point networking stack of a "VPN host", rather than in the network infrastructure. An L2TP tunnel such as the one show in FIG. 2 is often called a "voluntary tunnel".

Note that an IP host, with embedded VPN client software, has 2 IP addresses. The mobile host has an IP address on its home network and the LAC has a "care-of" IP address that is used to define the end point of a VPN tunnel. The LAC IP address must be locally acquired when the mobile host connects to a remote network.

FIG. 2 does not show how the LAC, in the VPN host, is connected to the Internet. If it is connected through a local Internet Service Provider (ISP), then it may obtain a local IP address from the ISP. If it is connected through a wireless LAN, then it must obtain a new care-of IP address each time it roams to a different IP subnet. [DHCP can be used, for example, to obtain an IP address, a default router IP address, and an IP subnet mask for the remote IP subnet.]

Before the remote host can communicate with the IP and IPX servers on the home network, as if it were part of the home network, it must have an IP and IPX addresses on the home network. The remote host can be assigned with permanent home IP and IPX addresses or it can dynamically acquire addresses from the NAS (with IPCP and IPXCP).

FIG. 3 shows an IP packet, from a remote host, as it exists in the L2TP tunnel.

The tunnel and L2TP headers are added by the LAC. The tunnel header contains source and destination IP addresses that identify end points in the LAC and LNS, respectively. The PPP and IP headers are added by the remote host. The IP header contains source and destination IP addresses that identify the remote host and IP server, respectively.

FIGS. 4 and 5 show example partial protocol stacks for a PPP host and a VPN host, respectively.

The "encapsulation" layer, in FIG. 5, includes network-specific logic for encapsulating L2TP packets. The "link" layer is responsible for establishing a link layer connection to the network. On a dial-up IP network, for example, the "link" layer may establish a PPP connection with a local ISP. IPCP is used on the local PPP connection to obtain a local IP address from the ISP. L2TP packets are then encapsulated in IP packets and forwarded to the LNS. The source and destination addresses, in the IP encapsulation header, identify L2TP tunnel end points in the client and LNS, respectively. Note that IPSec can be used to encrypt the encapsulated L2TP packet. FIG. 6 shows such an example protocol stack.

In FIG. 6, IP provides the encapsulation layer and PPP provides the data link layer. An optional "IPSec" layer has been inserted to illustrate how IPSec fits into a client VPN protocol stack. [IPSec is shown relative to its header position in an IPSec packet. The L2TP UDP layer is not shown.] PPP relies on an underlying link layer (not shown) and link-specific signaling logic to establish the low-level physical connection. The link layer passes "link up" and "link down" indications to the PPP layer. The IP entity at the top of the protocol stack is identified by a "permanent IP address". The encapsulation IP entity is identified by a "local IP address". L2TP sits on top of the local IP entity.

LNS/NAS Routing Logic.

An LNS typically exists in a multi-protocol router called a network access server (NAS). For the purpose of this discussion, an NAS has an array of logical PPP links and at least one internetwork interface. The NAS can advertise the array of PPP links as a single subnet, to other routers (i.e. with a routing protocol such as RIP), provided that all active network addresses on the PPP links belong to the common subnet. If an outbound packet arrives at the PPP subnet, then special "intra-subnet" routing logic is required to select the correct PPP link.

The LNS maintains VPN sessions. Each active VPN session is bound to a single logical PPP link. It is assumed that a large number of PPP hosts may compete for a smaller number of logical NAS PPP links. Therefore, a single NAS PPP link cannot be reserved for each PPP host. Instead, an idle PPP link is selected, from a pool of available links, and bound to a VPN session when the session is first established. Network addresses are then associated with the bound PPP link with PPP NCP negotiation. Note that a PPP host may obtain a network layer address from the NAS during NCP negotiation.

It is worth repeating an important point. PPP provides a standard mechanism for dynamically binding network layer addresses to a logical PPP subnet. In practice, a network layer address is initially obtained from the PPP entity at the network service provider. Seamless roaming for some transport protocols, including TCP, requires that a PPP host cannot change a network layer address after a transport connection is established.

The L2TP tunnel endpoint for a "PPP host" is provided by a LAC in the network infrastructure. If a PPP host roams from a LAC on a first IP subnet to a LAC on a second IP subnet, then a new L2TP session must be established, for the mobile PPP host, with the LNS for its home network. For seamless roaming, the LNS must "hand-off" the existing PPP connection to the new L2TP session.

The L2TP tunnel endpoint for a "VPN host" is provided by VPN client software (i.e. a LAC) that exists in the host protocol stack. A VPN host can potentially roam to a network service provider on a different IP subnet without losing its VPN session. Therefore, no special L2TP session hand-off logic is required in the LNS. [A PPP host, on the other hand, loses its old L2TP session when it roams to a different LAC.]

Current VPN Products.

Various network equipment vendors (i.e. Cisco Systems) provide network access servers that include LNS and/or LAC software. A LAC can be configured so that it automatically establishes a VPN tunnel to an LNS when it receives an incoming call from a remote host. The existence of the VPN tunnel can be transparent to the PPP entity in the remote host.

Microsoft Corporation provides "VPN client" software, where both the LAC and PPP end points are co-located in the same remote host, as described above. VPN client software can be installed so that it runs over point-to-point links or LAN links. For LAN links, the VPN client software encapsulates PPP frames in VPN tunnel packets, as described above. Packets sent to or from a VPN host are always routed through the LNS, even when the VPN host is attached to a LAN segment on its home network. Note that VPN client software adds networking overhead for mobile hosts that are "at home"; however, it forces packets from mobile hosts to always pass through a "secure" network entry point.

Mobility Issues in Current VPN Products:

A standard does not exist that defines how a VPN session "handoff" occurs when a mobile PPP host roams (i.e. to a different ISP end point) and, directly or indirectly, establishes a new VPN session. [An Internet Mobile PPP draft standard expired in June, 1999.]

The overhead associated with roaming is significant. A new VPN session must be established and PPP options must be renegotiated whenever a mobile PPP host roams to a new subnet.

Seamless roaming is not possible if a mobile host is forced to re-negotiate its network layer address, each time it roams.

A mobile host cannot always detect that it has roamed to a different IP subnet. On 802.11 links, for example, a mobile host cannot detect that it has roamed to a different IP subnet, unless it receives some sort of notification from the network infrastructure.

A signaling protocol does not exists that enables a mobile host to establish a logical point-to-point link, via a wireless LAN, to a LAC located in the infrastructure.

If LAC software is contained in mobile VPN hosts, then a LAC IP address must be allocated for each mobile host. A new IP address, subnet mask, and IP router, must be obtained for the LAC (i.e. with DHCP) each time the mobile host attaches to a different IP subnet. [One of the assumptions, in this document, is that such a solution is not acceptable.]

A mobile host on a wireless LAN does not "hang up" when it roams away; therefore, lost PPP connections may not be disconnected immediately.

Mobile VPN Tunneling Protocol.

The Mobile VPN Tunneling Protocol (MVTP) provides data link and IP tunneling services for mobile hosts on IEEE 802 LANs. In this document, tunneling services are described for PPP and L2TP packets; however, MVTP is designed to be extensible to other protocol types.

MVTP has the following primary components.

1) A Mobile VPN foreign agent or MVTP FA facilitates subnet roaming detection and provides a "care-of" IP address for mobile hosts.
2) An MVTP Client exists at the remote endpoint of an MVTP tunnel. A Global Endpoint ID globally identifies a client. An MVTP FA assigns a 16-bit Local Endpoint ID to each associated MVTP client.
3) An MVTP Server exists at the "home" endpoint of an MVTP tunnel. In this document, an MVTP Server is globally identified by an IP address.
4) A signaling protocol is used to dynamically establish MVTP tunnels for mobile hosts.
5) A VPN Gateway provides a gateway between an MVTP client and an L2TP network server (LNS), so that an MVTP server is not required. A VPN Gateway and is discussed in more detail on the section entitled Mobility for PPP Hosts.

MVTP is developed as the signaling and transport protocol for mobile hosts in two scenarios that correspond to FIGS. 1 and 2:

1) In the first case, MVTP is used to establish the link between a PPP host and a "VPN Gateway" in an MVTP FA. The VPN Gateway is, essentially, a LAC that concatenates a client-to-LAC MVTP PPP tunnel to a LAC-to-LNS L2TP tunnel.
2) L2TP is designed to run on top of any transport layer. In the second case, MVTP provides the transport for L2TP. A data link tunnel, between a mobile VPN host and an MVTP FA, is concatenated with an IP tunnel, between the MVTP FA and an MVTP server, to form a single logical tunnel for L2TP packets.

MVTP Features.

1) MVTP provides mobility for IP and non-IP protocols.
2) An MVTP Global Endpoint ID is can be a phone number, an IEEE 802 address, an ATM address, or an IP address. The Global Endpoint ID is analogous to a mobile host's Home IP Address in RFC 2002 Mobile IP.
3) MVTP provides a general purpose mobile transport for L2TP, PPP, and other data link protocols. An L2TP tunnel endpoint can exist in a mobile host or in an L2TP access concentrator.
4) MVTP mobility is transparent to L2TP for VPN hosts.

5) MVTP includes built-in tunnel authentication features, so that it is not necessary to re-authenticate at a higher (i.e. PPP or L2TP) layer when a new tunnel is established.
6) MVTP allows multiple tunnels to be multiplexed through a single remote "care-of" IP address. A mobile host is not required to explicitly obtain an IP address on a foreign network (i.e. with DHCP).
7) MVTP is designed so that a single foreign agent can support both RFC 2002 Mobile IP mobile hosts and mobile MVTP clients.

MVTP PDUs.

MVTP is identified by an Ethernet DIX type, an LLC DSAP, or an LLC SNAP type, on LAN links, with one exception. Mobile VPN foreign agent advertisement and solicitation messages can be sent as either data link PDUs or as extensions to standard RFC 2002 Mobile IP foreign agent advertisement and solicitation messages.

An MVTP data link foreign agent advertisement or solicitation PDU is sent to an MVTP 802 multicast address. Mobile IP advertisement and solicitation messages are sent to the IP limited broadcast address and the 802 broadcast address. An advertisement PDU, sent in response to a solicitation PDU, is transmitted to the unicast 802 address that is the source address in the solicitation PDU.

An MVTP PDU contains an MVTP header, MVTP PDU type-specific fields, and optional attribute-value pairs (AVPs). The MVTP header contains a control field that includes the MVTP PDU type. An MVTP AVP is structured as a <type, length, value> triple, as described in the L2TP RFC [7]. An MVTP PDU immediately follows the wireless LAN and LLC headers, on 802 LAN links.

An MVTP PDU is encapsulated in an IP packet for transport through an IP internetwork. The IP protocol type is Generic Router Encapsulation (GRE) or protocol 47. The GRE type field is set to the MVTP DIX type.

A Global Endpoint ID AVP is structured exactly like the multi-link PPP Endpoint Discriminator option described in RFC 1990 for Multi-link PPP. It includes a naming class that indicates the global naming space to which an associated identifier belongs. The naming space can be a "calling number", on dial-up links, a 48-bit IEEE 802 address, on 802 LAN links, an ATM address, or an IP address, for example.

The PDU type in the control field of an MVTP header, identifies one of the following PDU types:

MV-FAA. An MVTP FA periodically transmits Mobile VPN foreign agent advertisement (MV-FAA) PDUs to advertise IP subnet information and foreign agent services to MVTP clients. An MV-FAA must contain the following AVPs:

VPN Mobility Agent Advertisement. The value of a VPN Mobility Agent Advertisement AVP is defined exactly as the Mobility Agent Advertisement Extension, in RFC 2002, except that the type field value is changed to distinguish VPN mobility services from Mobile IP services. The AVP contains a Sequence Number field, a Registration Lifetime field, a Capabilities field, and a Care-of IP Address field.

Prefix Lengths. The value of the Prefix Lengths AVP is defined in RFC 2002. It contains the number of subnet bits for the MVTP FA Care-of IP address.

An MV-FAA PDU can be transmitted as an ICMP Router Advertisement message, as defined in RFC 1256 and RFC 2002, or as an MVTP data link PDU. The ICMP option is compatible with existing Mobile IP hosts. A single data link or ICMP foreign agent advertisement can contain both Mobile IP and Mobile MVTP mobility extensions. The Agent Advertisement and Prefix Lengths AVPs are structured as RFC 2002 mobility extensions when they are contained in ICMP router advertisement packets.

MV-FAS. An MVTP client transmits a Mobile VPN foreign agent solicitation (MV-FAS) PDU, to a multicast or broadcast address, to solicit the immediate transmission of an MV-FAA PDU from an MVTP FA. An MV-FAS PDU can be transmitted as an ICMP Router Solicitation message, as defined in RFC 1256, or as an MVTP data link PDU. The ICMP option is compatible with existing Mobile IP hosts. Any MVTP FA that receives an MV-FAS PDU transmits an MV-FAA PDU to the unicast 802 address of the client.

MV-DATA—Data PDUs are used to encapsulate PPP control and data frames, for PPP hosts, and L2TP messages for VPN hosts. The MVTP header for an MV-DATA PDU includes an Encapsulation Type field, a Length field, a Local Endpoint ID field, and optional attribute-value pairs (AVPs). The Encapsulation Type field is set to PPP_TO_L2TP, for PPP hosts, or L2TP_TRANSPORT, for L2TP hosts.

MV-RRQ—An MVTP Registration Request (MV-RRQ) PDU is sent from an MVTP client to an MVTP server, via an MVTP FA, to request the establishment of an MVTP tunnel. An MV-RRQ PDU contains a Home IP Address field, a Connect ID field, a Status field, an Encapsulation Type field, a Local Endpoint ID, an Identification field, and a Global Endpoint ID AVP. The Home IP Address identifies the IP tunnel endpoint on the MVTP client's home network. The Connect ID field is an increasing sequence number that is used to identify a registration attempt and is used to match registration request/response pairs. The Encapsulation Type identifies the encapsulated protocol (i.e. PPP or L2TP). [The Encapsulation Type is 0 if the client is not using tunneling services.] The Status field contains a Reset flag that is set on in the first MV-RRQ PDU for a PPP connection or L2TP session. The Status field contains a Roam Notify flag that is set on to request the MVTP HA to notify the "old" MVTP FA that the client has roamed. The Identification field is used for "replay" protection. The Local Endpoint ID is assigned, by the MVTP FA, as a local alias for the Global Endpoint ID. An MVTP Server must enter the Local Endpoint ID in outbound MV-DATA PDUs.

MV-RRP—An MVTP Registration Reply (MV-RRP) PDU is sent from an MVTP server to an MVTP client to indicate the status of a corresponding MV-RRQ. An MVTP connection is established when an M-RRP is received with a "successful" status. The MV-RRP contains the same fields as an MV-RRQ PDU. The MV-RRP sets the Local Endpoint ID in the client. The client must enter the Local Endpoint ID in inbound MV-DATA PDUs.

MV-DN—An MVTP Disconnect Notify PDU is sent from an MVTP client or server to close an MVTP connection. An MV-DN PDU contains a Connect ID field, a Local Endpoint ID field and a Status field. The Connect ID value must match the value of the Connect ID field in the corresponding MV-RRQ PDU that originally established the connection. The Connect ID and Endpoint ID fields are used to identify a "connection" and to filter "old" MV-DN PDUs.

Protocol Operation.

At least one active MVTP FA must be associated with an IP subnet. [An MVTP FA election protocol can be used to select a single active MVTP FA, for a subnet, from multiple MVTP FA candidates.] An MVTP FA periodically transmits a MV-FAA PDU to a well-known MVTP (or Mobile IP) multicast address.

As noted above, the MV-FAA PDU contains an IP "care-of" address, the IP subnet prefix length, a sequence number, capability information, and the unicast 802 address that identifies the MVTP FA's LAN interface. The IP subnet can be derived from the IP address and the IP subnet prefix length. The sequence number can be used to distinguish different instances of the same MVTP FA. A client should re-register if the sequence number "backs up".

An MVTP client is responsible for detecting an MVTP FA, for an IP subnet, and registering with its MVTP server, whenever it first roams to an IP subnet. An MVTP FA client can detect that it has roamed to a different IP subnet and discover an MVTP FA a) by listening for multicast or broadcast MV-FAA PDUs, b) by soliciting a unicast MV-FAA PDU with an MV-FAS PDU, c) with a proprietary data link mechanism, or d) with any combination of the above.

An MVTP client "registers" by sending an MV-RRQ PDU to the MVTP server, via the MVTP FA. The client increments the Connect ID when it first sends an MV-RRQ PDU to an MVTP FA. The client retransmits the MV-RRQ PDU, with the same Connect ID, if it does not receive an MV-RRP PDU, with a matching Connect ID, within a response timeout period. The destination 802 address in the LAN header, of the MV-RRQ PDU, identifies the LAN interface of the MVTP FA. The LLC SNAP type identifies the MVTP service access point in the MVTP FA. The MVTP Encapsulation Type identifies the MVTP application (i.e. PPP encapsulation or L2TP encapsulation).

An MVTP FA forwards an MV-RRQ PDU, from an MVTP client, to the MVTP server, encapsulated in an IP GRE datagram. [PPP encapsulation represents a special case, and is discussed in the section entitled "Mobility for PPP Hosts".] The MVTP FA selects a Local Endpoint ID for the client and inserts it into the MV-RRQ PDU. The destination IP address, in the IP datagram, is derived from the Home IP Address in the MV-RRQ PDU. The source IP address is the Care-of IP Address advertised by the MVTP FA.

An MVTP registration expires when the MV-RRQ Registration Lifetime period is reached. An MVTP client must periodically send MV-RRQ PDUs to maintain its mobility registration with the MVTP FA and the MVTP server. The Reset flag is set on in an "initial MV-RRQ PDU", which is the first MV-RRQ PDU that is sent after the MVTP client is directed to establish a link by the higher layer. The Reset flag is set off in any other MV-RRQ PDU.

An MVTP FA and an MVTP server must maintain a "mobility record" for each active MVTP client. A mobility record contains the following MVTP client information: a) the Global Endpoint ID, b) the Local Endpoint ID, c) the Connect ID, d) the Care-of IP Address, e) a Registration Age, and f) the Connection State.

The Global Endpoint ID AVP field in an MV-RRQ PDU uniquely identifies the MVTP client and its corresponding mobility record. An MVTP server updates its mobility record, for a client, when it receives a valid MV-RRQ PDU. The Care-of IP Address is set to the source IP address of the MV-RRQ PDU. The Registration Age is reset to 0.

An MV-RRQ PDU is valid if it passes authentication and if the Connect ID in the PDU is "newer" than the Connect ID in an existing mobility record, for the client. [Note that an MV-RRQ PDU (i.e. from a rapidly roaming mobile host) may arrive out-of-order.] A PDU Connect ID is newer if its value is greater (accounting for wrap-around) than the value in mobility record or if the Registration Age, in the mobility record, is greater than MAX_MVTP_PDU_LIFETIME. The server "authenticates" the MVTP client, before it updates the mobility record, to prevent "denial of service" attacks.

If the MV-RRQ PDU is valid, then the MVTP server updates the mobility record and returns an MV-RRP PDU, encapsulated in an IP GRE datagram, to the client, via the MVTP FA. The destination IP address is the Care-of IP Address of the MVTP FA. The MVTP FA forwards the MV-RRP PDU to the MVTP client in a data link MV-RRP PDU. The MV-RRP PDU contains the original Connect ID, assigned by the MVTP client, and the Local Endpoint ID, assigned by the MVTP FA.

When the client receives the MV-RRP PDU an MVTP tunnel is fully established and MV-DATA PDUs can be transmitted on the tunnel The Local Endpoint ID is entered into MV-DATA PDUs and MV-DN PDUs, transmitted on the MVTP tunnel, by the MVTP client and MVTP server FIG. 7 shows the sequence of events for establishing an MVTP tunnel.

MVTP Security.

MVTP enables a mobile host to changes its network point of access without notifying the L2TP and PPP layers. An MVTP server forwards outbound packets, for a client, to the current point of access. An attacker can deny service, for a client, or gain unauthorized access by masquerading as an MVTP client and sending an unauthorized MV-RRQ PDU, with the client's Global Endpoint ID. An attacker can deny service for a client by sending an unauthorized MV-DN PDU. MVTP does not include a challenge-response authentication protocol; therefore, it is possible for an attacker to "replay" an MV-RRQ or MV-DN PDU originally transmitted by a valid client.

MVTP security provisions for authentication and replay protection are identical to those defined in RFC 2002 for Mobile IP. MVTP Authentication AVPs are defined identically to Mobile IP Authentication Extensions. Each MVTP client, MVTP FA, and MVTP server must be able to support a security association for the MVTP client. The security association is identified by a Security Parameter Index and either a Global Endpoint ID or IP address. MV-RRQ, MV-RRP, and MV-DN PDUs, sent between an MVTP client and its MVTP server, must be authenticated with the Mobile-Home Authentication AVP. MV-RRQ and MV-RRP PDUs between a mobile node and its MV FA can, optionally, be authenticated with the Mobile-Foreign Authentication AVP.

The Identification field in an MV-RRQ, MV-RRP PDU, or MV-DN, is used for replay protection, as defined for Mobile IP registration packets, in RFC 2002. Replay protection can be based on timestamps or "nonces", just as for Mobile IP.

It is expected that replay protection, authentication, and privacy requirements, for higher layer data, are addressed by higher layer security protocols.

Mobile PPP.

This section discusses MVTP mobility support for PPP hosts, on wireless LAN links, hereafter referred to as Mobile PPP.

Mobile PPP adds the following components to an L2TP-based VPN:

1) MVTP is used to establish a logical point-to-point connection between a PPP host and a VPN Gateway, in an MVTP FA, over a wireless LAN link.
2) A VPN gateway automatically establishes an L2TP session, for a mobile host, with an LNS.

3) A mobile LNS is simply a standard LNS that is enhanced to support an L2TP session "hand-off" when a station roams to a different IP subnet.

FIG. 8 shows an example protocol stack for a typical WLAN PPP host. The MVTP client layer replaces the dialing logic in a point-to-point host that connects through a switched network. The WLAN layer provides wireless LAN framing.

A Mobile VPN foreign agent (MVTP FA) must exist on each IP subnet to which a mobile PPP host can roam. FIG. 9 shows the protocol stack in an MVTP FA that uses IP for the L2TP transport.

The VPN Gateway, in FIG. 9, concatenates MVTP data link connections with L2TP sessions, to provide an end-to-end PPP connection between a PPP host and its LNS. Note that the "LAN" and "Data Link" layers may be provided by a single LAN interface. The VPN Gateway replaces the L2TP Access Concentrator (LAC) in an ISP router that provides access on switched (i.e. dial-up) connections.

Note that MVTP PDUs cannot be reordered on an MVTP data link connection because the 802 LAN standard disallows frame reordering. L2TP is responsible for handling packet reordering on an L2TP session.

Operational Overview:

The MVTP client in a PPP host is responsible for detecting an MVTP FA, for an IP subnet, and establishing an MVTP data link connection with the VPN Gateway in the MVTP FA. An MVTP connection between a PPP host and an MVTP FA Gateway is analogous to the dial-up link between a PPP host and the LAC in an ISP, as shown in FIG. 1. As specified above, an MVTP client sends a MV-RRQ PDU to an MVTP server, through an MVTP FA, to establish an MVTP connection. The client retransmits the MV-RRQ PDU if it does not receive an MV-RRP PDU, with a matching connect ID, within a timeout period. The process is repeated whenever the PPP host roams to a different IP subnet.

For a PPP host, the Home IP Address, in an MV-RRQ PDU, is actually the IP address of the respective LNS for the home subnet. The VPN Gateway establishes an L2TP session for an MVTP client, when it first receives an MV-RRQ PDU, from the client. The gateway converts an MV-RRQ PDU to an L2TP ICRQ message and forwards it to the LNS. The connect ID in the MV-RRQ PDU is converted to an L2TP Call Serial Number AVP in the corresponding L2TP ICRQ message.

The MVTP FA Gateway returns an MV-RRP PDU to the client when it receives an L2TP ICRP PDU. If the session manager receives an MV-RRQ retransmission and an L2TP session already exists, then it immediately returns an MV-RRP PDU. PPP data and control packets are forwarded through the concatenated MVTP connection and L2TP session.

FIG. 10 shows the sequence of steps for establishing the concatenated MVTP connection and L2TP session. Note that the L2TP ICRQ, ICRP, and ICRN messages are sent on a reliable L2TP control connection. The setup steps for the control connection are not shown.

The MVTP client layer, in a PPP host, posts a "Link Up" indication to the PPP layer when it first receives an MV-RRP PDU, with a successful status. The PPP layer begins link negotiation after the "Link Up" indication is received.

The VPN Gateway must create a tunnel and establish an L2TP control connection with an LNS before it can establish an L2TP data session for an MVTP client. A single tunnel and L2TP control connection can be used to support multiple MVTP clients, that share a common LNS. However, a separate tunnel and L2TP control connection is required for each target LNS. Note that, in an enterprise environment, clients that belong to a common subnet can use the same LNS and, therefore, can share a single L2TP tunnel.

The MVTP Gateway must maintain a connection record for each active MVTP client. The connection record contains the 802 address of the client, the connection state, L2TP session information, and the MVTP Local Endpoint ID.

L2TP messages are identified by a "tunnel ID" and a "session ID" in the L2TP header. The tunnel and session IDs in an L2TP message identify the session at the destination, not at the source. The MVTP Gateway chooses its session ID, for an L2TP session, when it sends an ICRQ PDU to an LNS. The LNS then enters that session ID into each outbound L2TP message that it sends to the MVTP Gateway for the L2TP session. In a simple implementation, the L2TP session ID and the Local Endpoint ID can be the same, for a given MVTP client.

When the MVTP Gateway receives an outbound L2TP message, it uses the L2TP session ID to look up the MVTP connection record for the corresponding MVTP client. Likewise, when the MVTP Gateway receives an inbound MV-DATA PDU, it uses the Local Endpoint ID, in the MVTP header, to look up the MVTP connection record.

PPP control and data frames are encapsulated in MV-DATA PDUs, on WLAN links. An example MV-DATA PDU is shown in FIG. 11. If the data PDU is from an MVTP client, then the 802 destination address is the WLAN interface address of the MVTP FA and the 802 source address is the WLAN interface address of the PPP host. The MVTP header contains the Local Endpoint ID for the client.

PPP control and data frames are encapsulated in L2TP messages in the L2TP tunnel through the internetwork. L2TP frame formats are defined in the L2TP RFC [7].

An MV-DN PDU is used to close an MVTP connection. The MVTP Gateway sends an MV-DN PDU to close an MVTP connection if it receives an L2TP Call-Disconnect-Notify message, from the LNS, on the corresponding L2TP session.

An MVTP client sends an MV-DN PDU to close its MVTP connection if the PPP entity in the PPP host terminates its connection. The MVTP Gateway converts the MV-DN PDU to an L2TP Call-Disconnect-Notify message and sends it to the LNS.

An MVTP FA sends an MV-DN PDU to an MVTP client if it receives an MVTP PDU, from the client, that is not valid for the current connection state. For example, an MV-DN PDU is returned if an MV-DATA frame is received on a closed connection. An MVTP connection may be closed, for example, if the MVTP registration expires. The MVTP Gateway ignores outbound L2TP data if it does not have an active connection for the target client.

LNS Changes for Mobile PPP.

Mobile PPP does not require any changes in the LNS to support MVTP clients that do not roam after an MVTP connection is initially establish. A PPP host, for example, can use MVTP client software to establish a PPP connection with a conventional LNS, from a foreign network in an airport. The LNS changes described in this section are required to support a graceful "hand-off" when a mobile MVTP client roams to a new IP subnet. Some LNS implementations may not require any changes to support limited seamless mobility.

The PPP connection between a PPP host and its NAS still exists after a PPP host roams to a "new" MVTP FA on a different IP subnet. Likewise, the "old" L2TP session between the "old" MVTP FA and the LNS, for a PPP host, stills exists when the host roams to a "new" MVTP FA. When a new L2TP session is established, for the PPP host, the LNS must delete the old L2TP session and transfer the existing PPP connection to the new L2TP session.

PPP authentication should be renegotiated whenever a PPP connection is transferred to a new L2TP session. Ideally, other PPP parameters should be transferred from the old L2TP session to the new session without renegotiation. Network addresses, assigned to the PPP host by the NAS, must not be renegotiated when a new session is established. If PPP NCP renegotiation cannot be avoided, then PPP hosts must be assigned with permanent network addresses.

PPP authentication should be negotiated over a new L2TP session, before any old L2TP session is closed, to avoid "denial of service" attacks. PPP re-authentication requires further study.

[A similar problem exists with Multi-link PPP [6]. Multi-link PPP allows a single PPP end point to be multiplexed over more than one underlying link or L2TP session. Links can be dynamically added to or deleted from a "bundle" that logically serves as a single PPP connection. A new link, in a bundle, inherits the NCP parameters from the existing bundle; however authentication is required for each added link. Multi-link PPP is discussed in more detail below.]

The LNS must be able to identify the old L2TP session, for a PPP host, to transfer a PPP connection to the new L2TP session. The following AVPs are added to L2TP ICRQ messages to support L2TP session handoffs.

Global Endpoint ID. A new L2TP "Global Endpoint ID" AVP MUST be included in an L2TP ICRQ packet, for a mobile PPP host, to uniquely identify the host. The Global Endpoint ID is defined above in the MVTP specification.

Call Serial Number. A "Call Serial Number" AVP is defined in the L2TP Internet standard. It contains a progressively increasing value that is used to identify a call. If a mobile PPP host roams rapidly between IP subnets, then it is possible that an ICRQ packet may arrive out-of-order at the LNS. An ICRQ from an MVTP FA contains a "Call Serial Number" AVP, so that an LNS can detect and discard out-of-order ICRQ packets. [The Session Status AVP (see below) provides a method for overriding call sequencing logic in the LNS.]

The mobile host must generate the Call Serial Number value. For PPP hosts, the MVTP FA derives the Call Serial Number, for an L2TP ICRQ message, from the connect ID in the corresponding MV-RRQ PDU.

The Call Serial Number AVP is sufficient for strictly ordering data packets, sent over multiple L2TP sessions, provided that an LNS does not accept data from an "old" L2TP session after a "new" L2TP session is established. Note that the L2TP Nr field can be used to strictly order data packets on a single session.

An ICRQ message that does not contain a Call Serial Number AVP is always considered "newer" than any existing L2TP session.

Session Status. A new "Session Status" AVP can be included in an ICRQ message (i.e. from a mobile host. The Session Status AVP contains bit flags that are used to establish the L2TP session state. A Continue Session flag is set on in the Session Status AVP to indicate that any existing PPP session for the remote PPP host should be "continued" on the new L2TP session. The Continue Session flag, in an ICRQ message, is derived from the Reset flag in the corresponding MV-RRQ PDU. A Call Serial Number AVP is ignored unless the Continue Session flag is set on. The Continue Session flag can be used to determine if PPP parameters should be re-negotiated or "continued" on the new session.

Mobile PPP Security Considerations.

Mobile-Foreign Authentication AVPs can be used to authenticate MVTP registration between an MVTP client, in a PPP host, and an MVTP FA. Mobile-Home Authentication AVPs cannot be used to authenticate a corresponding L2TP tunnel. Instead, L2TP tunnel authentication or PPP authentication must be used to validate access for PPP hosts.

Mobile L2TP.

This section discusses how MVTP can be used as a seamless mobile transport for L2TP.

Operation Overview.

FIG. 12 illustrates the relationship between L2TP and MVTP. Note that Mobile L2TP requires an MVTP server in the LNS. Concatenated MVTP data link and IP tunnels provide the underlying transport for L2TP. An MVTP tunnel is initially created, as described in the Mobile VPN Tunneling Protocol section, when the L2TP entity in a mobile host "opens" the underlying transport tunnel. An L2TP tunnel/session, between a VPN host and an LNS, is not lost when the mobile host roams to a new IP subnet and the underlying MVTP tunnel changes; therefore, mobility is transparent to L2TP.

The MVTP Gateway in the MVTP FA simply translates between IP/GRE MVTP PDUs and data link MVTP PDUs. The LNS, for example, encapsulates L2TP messages in IP/GRE MV-DATA PDUs and forwards them to the MVTP FA. The destination IP address is the MVTP FA care-of IP address, for the MVTP client, and the source IP address is the IP address of the LNS. The MVTP gateway in the FA uses the Local Endpoint ID, in the MV-DATA PDU, to identify the MVTP client. The gateway deletes the IP/GRE header and adds an 802 LAN header, to convert the IP/GRE PDU to a data link PDU. The 802 destination and source addresses identify the client and MVTP FA LAN interfaces, respectively. The Ethernet DIX type or LLC SNAP type identifies the MVTP entity in the client. The process is reversed for inbound PDUs.

FIG. 13 shows an example L2TP message, sent from an MVTP server, encapsulated on an MVTP IP/GRE tunnel.

FIG. 14 shows the example L2TP message from FIG. 13, as forwarded by the MVTP FA, encapsulated on an MVTP data link tunnel.

The MVTP gateway in the MVTP FA must maintain a connection record for each active MVTP client. The connection record is double indexed by both the Global Endpoint ID and the Local Endpoint ID, of the client. The record also contains the client 802 address, the LNS IP address, and the MVTP connection state.

The MVTP Gateway will not forward MV-DATA PDUs inbound until the connection state, for the client, is OPEN. The connection state is set to OPEN, when the MVTP Gateway first receives an MV-RRP PDU, from the LNS, with a successful status. Note that the MVTP server is responsible for authenticating the MV-RRP PDU.

MVTP/L2TP Interface Requirements.

This section uses MVTP/L2TP interface primitives and indications to illustrate the interaction between L2TP and MVTP. It is not intended as an implementation specification.

A client or server MVTP entity provides a programming interface, to the L2TP layer, that is used to create and maintain an underlying transport tunnel for L2TP. An L2TP client uses an M-CONNECT request primitive to initially establish an MVTP tunnel. A Global Endpoint ID is a parameter to the M-CONNECT primitive. In this document, the Global Endpoint ID parameter must contain an IP address that identifies the MVTP Server in an LNS. An M-CONNECT request primitive causes the MVTP client to send an MV-RRQ PDU, to the IP address of the MVTP Server, with the Reset flag set on in the Status field. The MVTP client posts an M-CONNECT response indication to the L2TP client when it receives a matching MV-RRP PDU, with the Reset flag set on, from the peer MVTP server. The M-CONNECT indication contains a "handle" is used to identify the underlying transport tunnel.

The MVTP client must periodically reregister within its Registration Lifetime period and it must reregister when it roams to a new MVTP FA.

The L2TP client can establish an L2TP control connection and an L2TP data session after the M-CONNECT indication is received. The L2TP client posts an "Up" event to the PPP client when it receives a "successful" ICRP message from the L2TP server.

An LNS typically maintains a pool of PPP ports. An idle PPP port, in an LNS, is in a "listen" state, until an "Up" indication is received on the port. An idle L2TP server "port" is also in a "listen" state, waiting for a remote peer to establish a transport tunnel. An L2TP server port issues a LISTEN request primitive, to the MVTP server, to initially establish an L2TP tunnel with a peer client. The LISTEN primitive returns a "handle" to the L2TP server port to indicate that a tunnel is established (i.e. when an initial MV-RRQ PDU is received). The L2TP server port is bound to an idle PPP port when an L2TP session is established on the L2TP port (i.e. when an L2TP ICCN message is received).

As noted above, the Reset flag is set on in an "initial" MV-RRQ PDU. An MVTP server posts a "Reset" indication to the L2TP layer when it receives an MV-RRQ PDU with the Reset flag set on. The L2TP server may respond by posting successive "Down" and "Up" indications to the PPP layer (i.e. to trigger PPP renegotiation).

An L2TP entity uses an M-SEND-DATA primitive to send L2TP data or control messages on an MVTP tunnel. The "handle" for the MVTP tunnel is a parameter to the M-SEND-DATA primitive. An MVTP server uses the handle, for example, to locate the "mobility record" for the respective MVTP client. Note that multiple L2TP sessions can be multiplexed over a single handle or MVTP tunnel.

An L2TP entity uses an M-DISCONNECT request primitive to delete an MVTP tunnel. The M-DISCONNECT primitive causes an MVTP entity to send an MV-DN PDU to its peer. An MVTP entity posts an M-DISCONNECT response indication to the L2TP layer, when it receives an MV-DN PDU. The L2TP entity posts a "Down" event, to the PPP layer, when it receives an M-DISCONNECT indication.

An MVTP client does not post an indication to the L2TP layer when it roams to a new MTVP FA. Likewise, an MVTP server does not post and indication to the L2TP layer when it updates its mobility record for a client. Therefore, normal roaming is transparent to L2TP. It is possible that an MVTP client may lose network access for an extended period of time. An MVTP client posts an M-DISCONNECT indication to the L2TP layer if it cannot connect to any MVTP FA for an MVTP_SESSION_TIMEOUT time period. An MVTP server posts an M-DISCONNECT indication to the L2TP layer, for an MVTP tunnel, if the associated registration expires.

An MVTP client simply queues M-SEND-DATA requests when it is not attached to an MVTP FA.

An L2TP control message is sent on the reliable control connection for the L2TP tunnel. An L2TP entity will close a tunnel if it cannot deliver a control message to its peer. It is assumed that the total retry time for L2TP control messages is long enough so that all transmission retries will not be exhausted while an MVTP client is roaming.

Mobile L2TP Security Considerations.

An MVTP client and MVTP server must support the Mobile-Home Authentication AVP, as described above. A Mobile-Home Authentication AVP must be contained in MV-RRQ, MV-RRP, and MV-DN PDUs. MVTP authentication and replay protection prevents denial of service attacks and unauthorized access because any MV-RRQ or MV-DN PDUs, that do not pass authentication, are ignored. Therefore an unauthenticated MVTP tunnel cannot be bound to an L2TP session. An unauthenticated client or server cannot close an existing L2TP session.

Mobile L2TP provides better security than Mobile PPP because a security association, between a mobile host and its home LNS, is required to establish an MVTP tunnel. A mobile VPN host and its LNS are, by definition, part of the same enterprise network. An MVTP FA may not be part of that enterprise network. For example, an MVTP FA may provide public access services for hosts that subscribe to those services.

Mobile IPSec.

IPSec provides a standard mechanism for providing privacy, authentication, data integrity, and replay protection for IP and higher layer protocols. This section describes a method for using IP and IPSec as the underlying transport for MVTP PDUs.

An IP packet that uses IPSec security provisions must contain an IPSec AH and/or ESP header. The AH header is used for authentication, without encryption, and the ESP header is used if encryption is required. An IPSec header immediately follows the IP header. Any header or data, that follows an IPSec ESP header, is encrypted. [IPSec support for combined and nested headers is beyond the scope of this document.]

IPSec presents a special problem for MVTP for several reasons. IPSec is only defined for IP packets. An MVTP MV-DATA PDU, sent on a data link tunnel, does not contain an IP header. That problem can be solved if MV-DATA PDUs are encapsulated with an MVTP IP/GRE header, on both data link and IP MVTP tunnels.

FIG. 14 shows an example L2TP message, destined to an MVTP client, encapsulated on an MVTP data link tunnel. FIG. 15 shows the same L2TP message, as forwarded by the MVTP FA, with IP, IPSec, and GRE encapsulation.

The source and destination IP addresses, in such an IP encapsulated MVTP PDU, are the MVTP FA care-of IP address and the LNS IP address, respectively. End-to-end IP tunneling enables an MVTP client and an MVTP server to encrypt tunneled IP packets, with IPSec, if a security association exists between the MVTP client and server. An MVTP server, for example, encrypts an IP encapsulated MVTP PDU by inserting an IPSec ESP header, after the IP tunnel header and before the GRE header, and then encrypting the encapsulated IP payload. Therefore, the GRE and MVTP headers are also encrypted. In FIG. 15, the encrypted data is shown in gray. The MVTP client can decrypt the IP payload because it shares an encryption key with the server. An intermediate MVTP FA, however, cannot decrypt the IP payload; therefore, the encrypted MVTP header is not visible to the FA. The FA cannot forward the packet to the MVTP client, because it cannot read the Local Endpoint ID for the client.

The IPSec ESP header contains a 32-bit security parameter index (SPI). The SPI is an arbitrary number that is selected by the destination, of an IP packet, to identify the security association for the source. IPSec does not define the structure or content of the SPI or how it is distributed. The SPI is authenticated, but not encrypted; therefore, an intermediate node can read, but not modify, the SPI.

If IPSec is used to encrypt IP encapsulated MVTP MV-DATA PDUs, then the SPI must contain two parts. The high-order 16 bits must contain the Local Endpoint ID for the respective MVTP client. The low-order 16 bits contain the actual SPI. If an MVTP FA receives an outbound IP packet, destined to its Care-of IP address, and the IP protocol is IPSec ESP, then the FA determines the Local Endpoint ID from the SPI. The Local Endpoint ID is used to index into the connection record for the target MVTP client. The FA then encapsulates the IP packet with an 802 LAN header and sends it to the target MVTP client. The client removes the encapsulation headers, decrypts the IP packet, and posts the L2TP message to the L2TP layer.

Mobile Multi-link PPP (MMP).

This section describes how Mobile Multi-link PPP (MMP) can be used to provide a single logical PPP connection for a mobile "MMP host", that has an MMP protocol stack and a dual "LAN/WAN radio". An MMP host can roam seamlessly between LAN and WAN radio links, without losing its logical PPP connection. MMP is based on standard Multi-link PPP [6], L2TP [7], and MVTP.

Standard Multi-link PPP (MP) specifies a method for grouping multiple underlying PPP connections into a single "bundle" for a single virtual PPP connection. Links can be dynamically added to the bundle or deleted from the bundle. [MP was originally designed so that 2 ISDN "B" channels could be combined to form a single PPP connection, for increased bandwidth.]

The ITU HiperLAN standard and the IEEE 802.11 standard are gaining widespread acceptance as wireless LAN standards. Wireless LANs are primarily used for mobile access to a private enterprise network. However, it is expected that wireless LANs will also be used to provide network access in public areas such as convention centers, airport terminals, hotels, etc. Wireless LAN technologies cannot be used to provide ubiquitous coverage for several reasons, including limit coverage and unlicensed bandwidth usage. Currently, wireless LANs are primarily used to extend Ethernet LAN segments and a wireless LAN host is, essentially, an Ethernet host.

Wireless WAN technologies such as GSM, CDPD, and PCS can be used to provide ubiquitous coverage, but at a much lower bandwidth. Wireless WAN services are generally provided by a carrier that charges for "dial-up" access to the network.

An MMP host, and the LNS for its home subnet, must support standard Multi-link PPP [7]. An MMP host establishes a Multi-link PPP connection with its LNS. At any given time, the Multi-link PPP "bundle", for an MMP host, can include a "WAN link", a "LAN link", or both. In general, the WAN link is used to sustain ubiquitous coverage, when an LAN link is not available. It is assumed that the WAN link is a switched link between the MMP host and a "dial-up" port on the LNS for the MMP host's home subnet. The LAN link is actually a PPP connection that exists on top of an L2TP VPN, where MVTP is used as the mobile transport for L2TP. FIG. 16 shows the protocol relationships in a virtual PPP connection between an MMP host and the LNS for its home subnet.

In general, PPP LCP and PPP Authentication is negotiated separately for each member link. PPP NCP is negotiated for the "bundle". A new link inherits the network parameters of an existing bundle. It is not necessary to renegotiate network parameters as links are added and deleted. Therefore, network addresses are only negotiated when a bundle is initially created.

A new link is automatically assigned to a bundle based on an LCP Endpoint Discriminator option or an Authentication ID that is common for each link in the bundle. Note that an MVTP Global Endpoint ID can be used as an LCP Endpoint Discriminator.

A "link manager", in an MMP host, must control creating and deleting member links in the PPP bundle. In general, it is assumed that a "LAN link" is created whenever a LAN connection to an MVTP FA is available. A WAN link must be created when a LAN link is not available. It may be desirable to maintain a WAN link for some period of time, after a LAN link is established, to avoid sporadic WAN connections (i.e. for a rapidly roaming mobile host).

A member link is terminated with normal PPP LCP procedures using LCP Terminate-Request and Terminate-Ack packets on that member link.

REFERENCES

[1] Perkins, C., Editor, "IP Mobility Support", RFC 2002, October 1996.

[2] Simpson, W., Editor, "The Point-to-Point Protocol (PPP)", STD 51, RFC 1661, July 1994.

[3] Naganand Doraswamy and Dan Harkins. IPSec: The New Security Standard for the Internet, Intranets, and Virtual Private Networks. Prentice Hall PTR, 1999.

[4] Charles E. Perkins. Mobile IP: Design Principles and Practices. Addison-Wesley, 1998.

[5] James Carlson. PPP: Design and Debugging. Addison-Wesley, 1998.

[6] Sklower, K., "The PPP Multilink Protocol (MP)", RFC 1990, August 1996.

[7] Townsley, W. M., "Layer Two Tunneling Protocol (L2TP)", RFC 2661, 1999.

What is claimed is:

1. A communication network system capable of providing communication via an internetwork, the communication network system comprising (a) a tunnel server which provides for a tunneling service via an internetwork, and has a global address for identifying a first end point of a tunnel provided by the tunneling service;

(b) a mobile wireless system for communicating via a wireless link, and having a mobile virtual tunneling protocol client which has access to the global address for the first end point so as to enable communication with the tunnel server, the mobile wireless system being capable of being transported to a location remote from the first end point; and (c) a tunnel agent subsystem for communication via the wireless link with the mobile virtual tunneling protocol client of the mobile wireless system and for communication via an internetwork with the mobile virtual tunneling protocol server for establishing a mobile virtual tunneling protocol tunnel between the mobile virtual tunneling protocol client of the mobile wireless system located at a second end point remote from the first end point and the mobile virtual tunneling protocol server at the first end point, the tunnel agent subsystem assigning to the mobile wireless system a local end point identification for identifying the second end point of the mobile virtual tunneling protocol tunnel.

2. A communication network system according to claim 1, with the mobile wireless system having provision for authenticating a mobile virtual tunneling protocol registration between the mobile virtual tunneling protocol client of the mobile wireless system and a tunnel agent subsystem with which the mobile wireless system has wireless communication, prior to opening of the mobile virtual tunneling protocol tunnel for communication.

3. A communication network system according to claim 1, with the mobile wireless system being capable of communicating via its wireless link and via an internetwork with the first end point utilizing a mobile virtual tunneling protocol at the data link layer, the mobile virtual tunneling protocol being transparent to protocols above the data link layer.

4. A communication network system according to claim 1, with the mobile wireless system being capable of communicating via its wireless link and via an internetwork with the first end point utilizing a mobile virtual tunneling protocol, while the mobile wireless system runs an arbitrary network-layer protocol and roams seamlessly across network boundaries.

5. A communication network system according to claim 1, with the tunnel server comprising a layer two tunneling protocol (L2TP) network server with a point-to-point port serving as the first end point of the mobile virtual tunneling protocol tunnel.

6. A communication network system according to claim 1, with the tunnel agent subsystem being operative to establish a mobile virtual tunneling protocol tunnel for a mobile wireless system which supports a non internet protocol (non-IP).

7. A communication network system according to claim 1, with the mobile wireless system having wide area and local area connectivity so that the mobile wireless system can roam between a wireless link to a remote local area network which is coupled to the first end point via an internetwork, and a wide area wireless link to a wide area network without losing its logical connection to the first end point.

8. A communication network system according to claim 1, with the mobile wireless system having wide area connectivity utilizing a wireless wide area link that is maintained for a period of time after a wireless local area link becomes available, to facilitate rapid roaming of the mobile wireless system.

9. A communication network system according to claim 1, wherein the tunnel agent subsystem serves to concatenate a point-to-point protocol (PPP) tunnel, and a layer two tunneling protocol (L2TP) tunnel.

10. A communication network system according to claim 1, wherein a data link tunnel from a mobile wireless system is concatenated with an Internet Protocol (IP) tunnel to form the mobile virtual tunneling protocol tunnel.

11. A communication network system according to claim 1, wherein the global address identifying the first end point of the mobile virtual tunneling protocol tunnel is a phone number.

12. A communication network system according to claim 1, wherein the global address identifying the first end point of the mobile virtual tunneling protocol tunnel is an IEEE 802 address.

13. A communication network system according to claim 1, wherein the global address identifying the first end point of the mobile virtual tunneling protocol tunnel is an ATM address.

14. A communication network system according to claim 1, wherein the global address identifying the first end point of the mobile virtual tunneling protocol tunnel is an Internet Protocol (IP) address.

15. A communication network system according to claim 1, which supports both enterprise and global roaming of the mobile wireless system.

16. A communication network system according to claim 1, which supports rapid roaming of the mobile wireless system.

17. A communication network system according to claim 1, wherein the tunnel agent subsystem supports a multiplex of multiple connections.

18. A communication network system according to claim 1, which utilizes a mobile virtual network tunneling protocol which is transparent to protocols above the data link layer.

19. A communication network system capable of providing communication via an internetwork, the communication network system comprising
 (a) a mobile virtual tunneling protocol server which provides for a tunneling service via an internetwork, and has a global address for identifying a first end point of a tunnel provided by the tunneling service;
 (b) a mobile wireless system for communicating via a wireless link, and having a mobile virtual tunneling protocol client which has access to the global address for the first end point so as to enable communication with the mobile virtual tunneling protocol server, the mobile wireless system being capable of being transported to a location separated from the first end point by an internetwork; and
 (c) said mobile wireless system being operable when in wireless communication with a remote network separated from the mobile virtual tunneling protocol server by an internetwork to obtain assignment of a local end point identification from the remote network for identifying a second end point for a mobile virtual tunneling protocol tunnel, such that the mobile virtual tunneling protocol client of the mobile wireless system can establish via a wireless link to the remote network, a mobile virtual tunneling protocol tunnel for communication with the mobile virtual tunneling protocol server.

20. A communication network system according to claim 1, wherein communication from the tunnel agent subsystem to the tunnel server enters the tunnel server via a point-to-point port.

21. A communication network system according to claim 19, wherein communication from second end point to the first end point enters the mobile virtual tunneling protocol server via a point-to-point port.

22. A communication network system capable of providing communication via an internetwork, the communication network system comprising
 (a) a home network having a mobile virtual private network tunneling protocol server which provides for a tunneling service via an internetwork;
 (b) a mobile wireless system for communicating via a wireless link, and having a mobile virtual private network tunneling protocol client which provides for a tunneling service via an internetwork; and
 (c) a mobile virtual private network tunneling protocol foreign agent subsystem for communication via an internetwork with the mobile virtual private network tunneling protocol server and for communication via the wireless link with the mobile virtual private network tunneling protocol client of the mobile wireless mobile system to establish a mobile virtual private network tunneling protocol tunnel between the mobile virtual private network tunneling protocol client of the mobile wireless system and the mobile virtual private network tunneling protocol server of the home network, so as to enable communication between the mobile wireless system and the home network via the wireless link and via an internetwork when the mobile wireless system is at a location remote from the home network;

(d) wherein communication from the mobile virtual private network tunneling protocol foreign agent subsystem to the home network enters the home network via a point-to-point port.

* * * * *